UNITED STATES PATENT OFFICE.

NILS SHOLTEWSKÜ VON SCHOULTZ, OF SALINA, NEW YORK.

PROCESS FOR PURIFYING SALT-WATER PREPARATORY TO MANUFACTURING SALT.

Specification forming part of Letters Patent No. 298, dated July 29, 1837.

*To all whom it may concern:*

Be it known that I, NILS SHOLTEWSKÜ VON SCHOULTZ, of Salina, in the county of Onondaga and State of New York, have invented a new and useful Mode of Purifying Salt-Water Used for the Manufacturing of Fine and Coarse Salt; and I do hereby declare that the following is a full and exact description.

The nature of my invention and discovery consists in decomposing the impurities kept in solution by the salt-water, which impurities chiefly consist of muriate of magnesia, sulphate of magnesia, muriate of lime, sulphate of lime, sulphate of soda, carbonate of iron, iodine, and a bituminous oil, &c. This decomposition is performed before the salt-water is drawn into the kettles or pans in the ordinary wooden cisterns belonging to the salt-works, if said cisterns are of such dimensions that they contain sufficient water for twenty-four hours' consumption in their respective works; but, as the impurities must have time to sink to the bottoms of the cisterns before used in the kettles or pans, three cisterns at least must be attached to each salt-work, each cistern containing water enough for twenty-four hours' boiling, thus permitting the water to settle during forty-eight hours.

To enable others skilled in the art to use my invention or discovery, I will proceed to describe the operation, first remarking, however, that salt-water contained in different wells differ from each other in their composition. Wherefore a different method for purifying the salt-water in one class of wells must be used, when compared with the method of purifying the water drawn from the second class of wells.

Salt-wells may be divided into two classes. In the first class the impurities consisting of sulphate of lime and carbonate of lime predominate, and the salt manufactured out of that water will be highly impure by containing the two above-named impurities, more or less in proportion to what the water kept in solution before the evaporation. In the second class the impurities consisting of muriate of magnesia and muriate of lime predominate, and the salt manufactured out of that water will not only be impure by containing these two substances, but will never dry, in consequence of the two deliquescent salts, which continually absorb water from the atmosphere, whereby a continued draining is occasioned, with a severe loss of salt. The salt-wells at Onondaga, in the State of New York, belong to the first class. The salt-wells at Kanawha, in the State of Virginia, belong to the second class.

For purifying the salt-well water of the first class, or where sulphate and carbonate of lime predominate, I take the following method: In a wooden cistern containing six hundred cubic feet of water I throw fifty bushels of charcoal, (or mineral coal, if attention is paid to the quantity of carbon contained in the said mineral coal.) Then I fill the cistern with the salt-water. When full, one pound and two ounces of alum is thrown in, and the water is well stirred, and then left to settle during forty-eight hours, after which time it is fit for use.

For purifying the salt-well water of the second class, or where muriate of magnesia and muriate of lime predominate, I take the following method: In a wooden cistern containing five thousand cubic feet of water I throw one hundred bushels of mineral coal. Then I begin to fill the cistern. When half-full, I throw into the water one-sixteenth part of a bushel of quick-lime, and stir the water. When the cistern is full, three pounds of alum is thrown in, the water stirred, and left to settle during forty-eight hours, after which time it is fit for use. The lime is here used for the decomposition of the muriate of magnesia, precipitating the magnesia, and forming with the muriatic acid muriate of lime, which latter is decomposed by the influence of coal and alum. The lime must first be thrown in and then the alum, because if the order is reversed the lime would act on the alum and decompose it.

To use lime for the purifying of salt-well water belonging to the first class—for instance, at Onondaga, in the State of New York—would not only be useless, but hurtful, inasmuch as the lime, decomposing none of the impurities, would be found in the salt.

The above-mentioned quantity of coal will be sufficient for a month, but the other substances—alum and lime—must be used every time a cistern is filled.

When the presence of iodine is so great that it corrodes the vessels I use one-fourth part of an ounce of sulphate of manganese, which, enveloped in paper, is thrown in the cistern, and will be renewed every fourteenth day.

What I claim as my mode and discovery, and desire to secure by Letters Patent, is—

The united effect of carbon, alum, and lime, and sulphate of manganese on the salt-well water for the purpose of purifying said waters for the use of manufacturing salt.

District of Columbia, Washington, the 30th of May, 1837.

N. SHOLTEWSKÜ VON SCHOULTZ.

Witnesses:
    JOS. G. CADLE,
    MARSHALL BROWN.